United States Patent
Piirainen

(10) Patent No.: US 6,173,301 B1
(45) Date of Patent: Jan. 9, 2001

(54) METHOD OF GENERATING SIGNAL AMPLITUDE RESPONSIVE TO DESIRED FUNCTION, AND CONVERTER

(75) Inventor: Olli Piirainen, Oulu (FI)

(73) Assignee: Nokia Telecommunications Oy, Espoo (FI)

( * ) Notice: Under 35 U.S.C. 154(b), the term of this patent shall be extended for 0 days.

(21) Appl. No.: 09/117,976

(22) PCT Filed: Dec. 17, 1997

(86) PCT No.: PCT/FI97/00799
§ 371 Date: Aug. 11, 1998
§ 102(e) Date: Aug. 11, 1998

(87) PCT Pub. No.: WO98/30949
PCT Pub. Date: Jul. 16, 1998

(30) Foreign Application Priority Data

Dec. 18, 1996 (FI) ........................................... 965103

(51) Int. Cl.[7] .................................................. G06F 1/02
(52) U.S. Cl. ....................................................... 708/272
(58) Field of Search ................................. 708/270–277

(56) References Cited

U.S. PATENT DOCUMENTS

| | | | |
|---|---|---|---|
| 4,326,260 | * | 4/1982 | Gross .................................. 708/272 |
| 4,482,974 | * | 11/1984 | Kovalick .............................. 708/276 |
| 4,482,975 | * | 11/1984 | King et al. ........................... 708/272 |
| 4,486,846 | * | 12/1984 | McCallister .......................... 708/276 |
| 4,878,187 | * | 10/1989 | Buneman ............................. 708/276 |
| 4,905,177 | | 2/1990 | Weaver, Jr. et al. ................. 708/276 |

FOREIGN PATENT DOCUMENTS

| | | |
|---|---|---|
| 25 39 628 | 3/1976 | (DE) . |
| 0 443 242 | 8/1991 | (EP) . |
| WO 96/32796 | 10/1996 | (WO) . |

\* cited by examiner

*Primary Examiner*—David H. Malzahn
(74) *Attorney, Agent, or Firm*—Altera Law Group, LLC

(57) ABSTRACT

The invention relates to a method for generating a signal amplitude behaving according to a desired function and to a converter implementing the method. In the method, a function that is used for controlling the behaviour of a signal amplitude is piecewise linearized to provide straight lines; a slope and a constant term of each straight line is stored in a memory (202 and 203); and a midpoint of each straight line is shifted to form an origin in a common coordinate system. Variable data (213) is used as address data, which is divided into an MSB (207) and an LSB part (208). The MSB part (207) is used for addressing from the memory (202 and 203) the slope and the constant term of the straight line. The LSB part (208) functions as a variable of a common coordinate system of the straight lines. The amplitude is generated by summing in a summer (205) a product determined by the slope and the LSB part to the constant term, the product being generated in means (204) as a selected summing of arithmetically shifted, masked and complemented slopes controlled by the LSB part.

32 Claims, 3 Drawing Sheets

US 6,173,301 B1

METHOD OF GENERATING SIGNAL AMPLITUDE RESPONSIVE TO DESIRED FUNCTION, AND CONVERTER

FIELD OF THE INVENTION

The invention relates to a method for generating a signal amplitude behaving according to a desired function; in said method amplitude is generated digitally and variable data of the function is used as address data.

The invention also relates to a converter for generating a signal amplitude behaving according to a desired function, the converter being arranged to generate the amplitude digitally and to use variable data of the function as address data.

BACKGROUND OF THE INVENTION

In Direct Digital Synthesis (DDS), desired signal behaviour is achieved by converting digital phase data or other variable data to digital amplitude data, for instance by means of look-up tables. The digital amplitude data can then be converted to an analog amplitude by a digital-to-analog converter, or the amplitude data can be further used e.g. for signal phase or frequency processing.

A sine form signal converted from phase data represents a typical DDS conversion. The simplest way to perform the conversion is to store amplitude values of a sine function in a ROM memory (Read Only Memory) functioning as a look-up table, said values being indicated by the phase data. The use of look-up table alone will, however, lead to extensive deployment of memory which, in turn slows down the converter and the frequency of the signal obtained from the converter.

To reduce the need for memory, it is possible to approximate the function according to which the amplitude is to behave. One alternative is to use the Taylor series expansion disclosed in U.S. Pat. No. 4,905,177. From the series expansion are taken into account three first terms, which are used for making the conversion. An impairment of the method is that it requires a third, non-linear term and a multiplier for performing multiplication. Due to such shortcomings, the solution is slow.

SUMMARY OF THE INVENTION

An object of the present invention is thus to provide a solution which applies an amplitude according to a desired function in an approximative manner and which uses neither non-linear terms nor multiplication.

This is achieved with a method of the type described in the preamble, characterized by representing a desired amplitude behaviour in an approximative manner by means of a predetermined number N of piecewise straight lines, an slope and a constant term of which are stored, said straight lines being generated using a linear regression or the like and comprising a predetermined number M of variable values; dividing address data in two parts, a first part functioning as an address for the slope and the constant term of each straight line and a second part corresponding to a variable value on each piecewise straight line; converting the addresses of the second part of the address data to negative and positive variable values of the straight lines so that an address substantially in the middle of the second part of the address data becomes a variable value, which is preferably zero; selecting, by means of the first part of the address data, the slope and the constant term of each generated approximative straight line and selecting, by means of the second part, a variable value on a piecewise straight line; generating, by means of the variable value and the slope, a coefficient term of the piecewise straight line; generating a desired amplitude value by summing the coefficient term and the constant term of the piecewise straight line.

This is achieved with a method of the type described in the preamble, characterized by generating, by means of straight lines, a piecewise linear approximation of a function $g(z)=f(z)-tz$, where $f(z)$ is a function according to which the amplitude is to behave, $z$ is a variable value and $t$ is a constant, said approximation comprising a predetermined number N of straight lines, an slope and a constant term of which are stored; said straight lines being generated by a linear regression or the like and comprising a predetermined number M of variable values; dividing address data in two parts, a first part functioning as an address for the slope and the constant term and for the first part $tz$ of the address data, multiplied by the constant, in each straight line, and a second part corresponding to a variable value on each piecewise straight line; converting addresses of the second part of the address data to negative and positive variable values so that an address substantially in the middle of the address data becomes a variable value, which is preferably zero; selecting, by means of the first part of the address data, the slope, the constant term and the first part $tz$ of the address data, multiplied by the constant, in each generated, approximative straight line, and selecting, by means of the second part, a variable value on the piecewise straight line; generating, by means of the variable value and the slope determined by the second part of the address data, an slope of the piecewise straight line; generating a desired amplitude value by summing the coefficient term, the constant term and the first part $tz$ of the address data, multiplied by the constant, of the piecewise straight line.

A converter of the invention is characterized in that the converter comprises a memory for describing the behaviour of an amplitude according to a desired function on approximatively piecewise straight lines, with an slope and a constant term being stored in a memory, said straight lines being generated by a linear regression or the like and comprising a predetermined number of variable values; means for dividing the address data in two parts, a first part determining the slope and the constant term of each generated approximative straight line, and a second part corresponding to variable values of each piecewise straight line; means for converting addresses of the second part of the address data to positive and negative variable values so that an address substantially in the middle of the second part of the address data becomes a variable value, which is preferably zero, and for generating, by means of the variable value and the slope based on the second part of the address data, a coefficient term of a piecewise straight line; means for generating desired amplitude data by summing the coefficient term and the constant term of the piecewise straight line.

The converter of the invention is characterized in that the converter comprises a memory for generating, by means of straight lines, a piecewise linear approximation of a function $g(z)=f(z)-tz$, where $f(z)$ is a function according to which an amplitude is to behave, $z$ is a variable and $t$ is a constant, the approximation comprising a predetermined number N of straight lines, with an slope and a constant term being stored in the memory, said straight lines being generated using a linear regression or the like and comprising a predetermined number M of variable values; means for generating a first part $tz$ of the address data multiplied by the constant; means for dividing the address data in two parts, a first part determining the slope and the constant term of each generated approximative straight line, and a second part corresponding to variable values of each piecewise straight line; means for converting the addresses of the second part of the address data to positive and negative variable values so that an address substantially in the middle of the address data becomes a variable value, which is preferably zero, and for generating a coefficient term of the piecewise straight line, by using the slope and the variable value based on the second part of the address data; means for summing a first constant part and the first part tz of the address data multiplied by the constant and means for generating a desired amplitude data by summing the coefficient part and the corrected constant part of the piecewise straight line.

The method of the invention provides considerable advantages. An approximative method allows the size of the memory to be reduced, thus accelerating the operation of the inventive solution. In addition, the operation of the solution can be speeded up by avoiding multiplication operations.

DESCRIPTION OF THE DRAWINGS

In the following the invention will be described in more detail, with reference to the examples illustrated in the attached drawings, in which.

DESCRIPTION OF PREFERRED EMBODIMENTS

A solution of the invention is well-suited for generating a high-frequency signal, which makes the invention particularly suitable for a digital radio system where it can be used for generating for instance a sine-form carrier wave. The solution provides a digital amplitude value, based on a desired function, that can be used directly as an amplitude value of a signal, or the amplitude value can be used to guide a phase, frequency or other characteristic of the signal. The principle of the solution is suited to the generating of any signal based on a function that can be linearized.

In a method of the invention a function according to which the signal amplitude is to behave is piecewise linearized to generate straight lines; an slope and a constant term of each straight line is stored; and a shift from one coordinate system to another is made so that the midpoint of each straight line moves to the origin of a common coordinate system of the straight lines. A variable of the original function provides address data used for indicating the slope and the constant term of the approximative straight line. The variable of the common coordinate system of the straight lines is then multiplied by the slope for generating the coefficient term, and the constant term is added to the coefficient term for generating the amplitude value.

Figure 1:
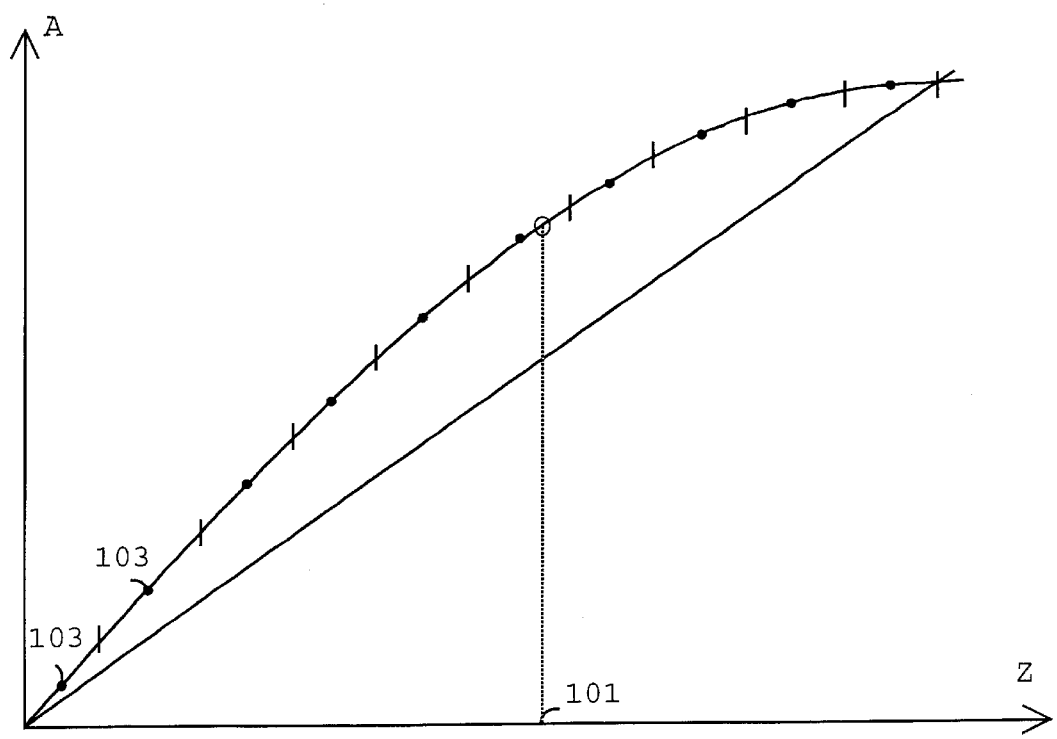
FIG. 1 is a graphic illustration of a solution of the invention applied to a signal behaving according to a sine function.
Figure 2:
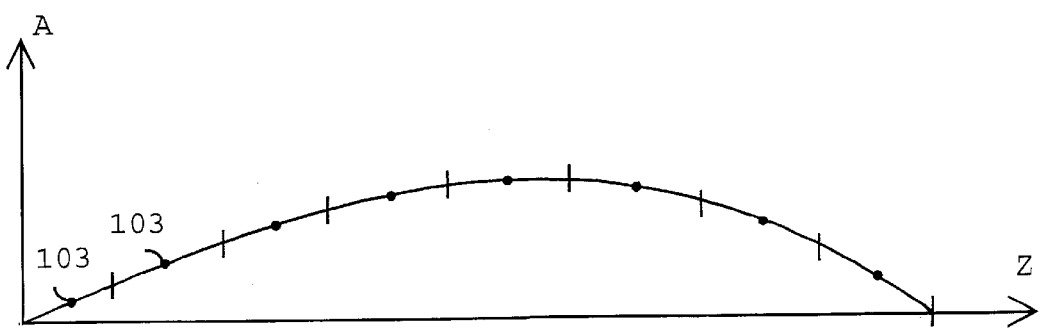
FIG. 2 is a graphic illustration of a solution of the invention applied to a signal behaving according to a function $sin(z)-tz$.

Let us now study the method of the invention with reference to FIGS. 1 and 2. FIG. 1 shows one quarter of a sine function. An entire sine function can be generated from a single quarter by means of simple mappings. A cosine function, in turn, is generated by means of a phase shift of a sine function. FIG. 1 shows a straight line which acquires at points z=0 and z=Π/2 the same values as a sin(z). This example assumes that a signal amplitude behaving according to a sine function is to be generated. A general case of the method is one where a desired function f is approximatively linearized using N straight lines. An slope $k_1$ and a constant term $c_1$ of the straight lines thus change according to the value of the variable z in such a way that with each value z only one straight line approximates the function f(z), i.e.

$$f(z) \approx \begin{cases} k_1 z + c_1 \\ k_2 z + c_2 \\ \ldots \\ k_N z + c_N \end{cases},$$

where z is a variable and $k_1$ and $c_1$ are constants. The curve of the sine function is thus piecewise linearly approximated by means of N straight lines $y=k_i z+c_i$, where $i \in [1, 2, \ldots, N]$. M points are selected on an approximative part of each straight line. In the method the curve is linearized by any method suitable for piecewise linearization, for instance by linear regression. Linearization can provide a continuous or discontinuous, piecewise linear approximation of a desired function. In connection with linearization the straight lines are preferably moved to one and the same coordinate system, whereby the variable z is changed to a variable x, and a midpoint 103 of the approximative part of the straight line is set at the origin. The information that the original variable z comprises is thus used in such a way that part of the information of the z variable determines the approximative straight line and part of it determines the value of the x variable associated with the straight line. In the method the slope $k_i$ and the constant part $c_i$ of each straight line are stored in a memory and their values can be retrieved from the memory on the basis of a rough value of the variable z, which is preferably an MSB part (Most Significant Bits). A precise part of the z variable, which is preferably an LSB part (Least Significant Bits), determines which point on the piecewise straight line has been selected of the x variable, allowing the amplitude value to be determined. This is performed by multiplying the value of the x variable by the value of the slope $k_i$ and adding the constant term $c_i$ to a coefficient term $_i k$ x thus obtained.

FIG. 2 illustrates a case in which a linear function, i.e. a formula $g(z)=sin(z)-(tz+a)$ where t and a represent constants, is subtracted from a sine function. In the example the function g is precisely $$sin(z) - \frac{2}{\pi}z,$$

whereby the straight line receives the same values as sin(z) at points z=0 and $$z = \frac{\pi}{2}.$$

The straight line $$l(z) = \frac{2}{\pi}z$$

is shown in FIG. 1 below the curve of the function sin(z). In the solution of the invention, the linearization of the function g is performed in the same way as in FIG. 1, the calculation of the amplitude being also performed in the same way. In this solution the generating of a final amplitude behaving according to the desired function sin(z) requires, however, that the impact of the linear part l(z) is restored.

In a linear regression the linear dependence of v from w needs to be known and the curve is therefore a straight line. One linear regression method is the method of the least square sum. In this method is selected a straight line to which the sum of square distances of all the points in the quantity of points is the smallest. In a solution of the invention, the quantity of points comprises the signal amplitude values on the part to be approximated. Each approximative straight line can be expressed using the formula $$v - \hat{v} = k_i(w - \hat{w}) \Rightarrow \quad (2)$$

$$v = k_i w + c_i, \quad (2b)$$

where $k_i$ is an slope, $c_i$ is a constant part, $\hat{v}$ is a mean value of variable v and $\hat{w}$ is a mean value of variable w. So the form of $k_i$ is $$k_i = \frac{s_{wv}}{s_v^2}, \quad (3)$$

where $s_{wv}$ represents covariance between variables w and v, and $S_w$ represents variance of variable w. Variance is calculated for instance as follows $$s_w = \frac{1}{n-1}\sum_{j=1}^{n}(w_j - \hat{w})^2, \quad (4)$$

where $w_j$ is a point j of variable w. Covariance $s_{wv}$ of variables, in turn, is calculated for instance using the formula $$s_{wv} = \frac{1}{n-1}\sum_{j=1}^{n}(w_j - \hat{w})(v_j - \hat{v}), \quad (5)$$

where $v_j$ is a point j of variable v. The form of constant part $c_1$, in turn, is $c_i = \hat{v} - k_i\hat{w}$. In the inventive method, absolute values can be used instead of squares. Linear regression can also be replaced by other similar methods for generating straight lines. The method used for generating the straight lines is not important in the invention, the only important thing is the piecewise linearization of the function related to the signal.

Figure 3:
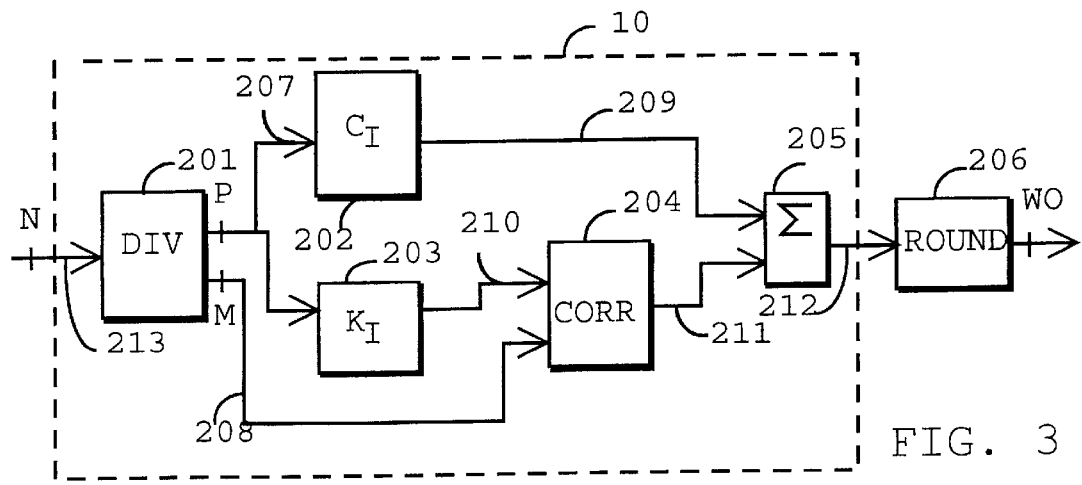
FIG. 3 is a block diagram illustrating a converter of the invention.
Figure 4:
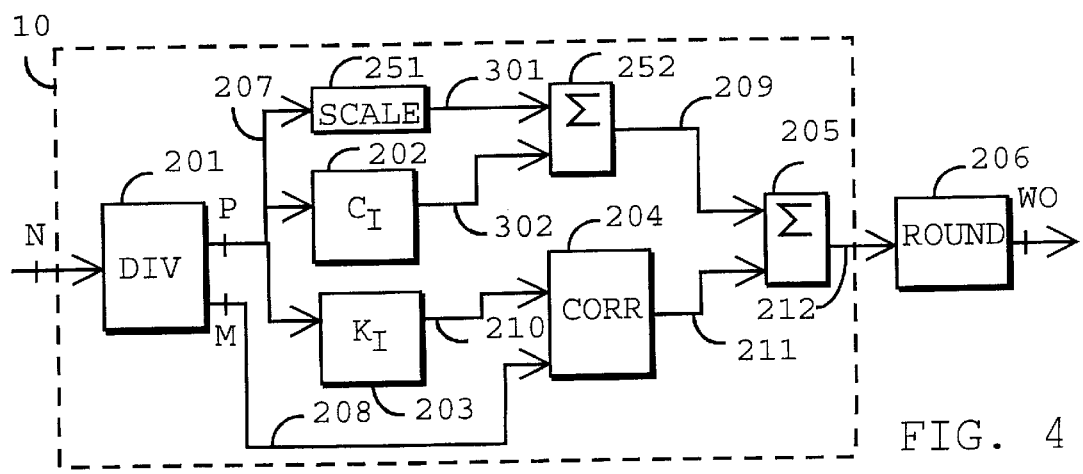
FIG. 4 is a block diagram illustrating a converter of the invention.
Figure 5:
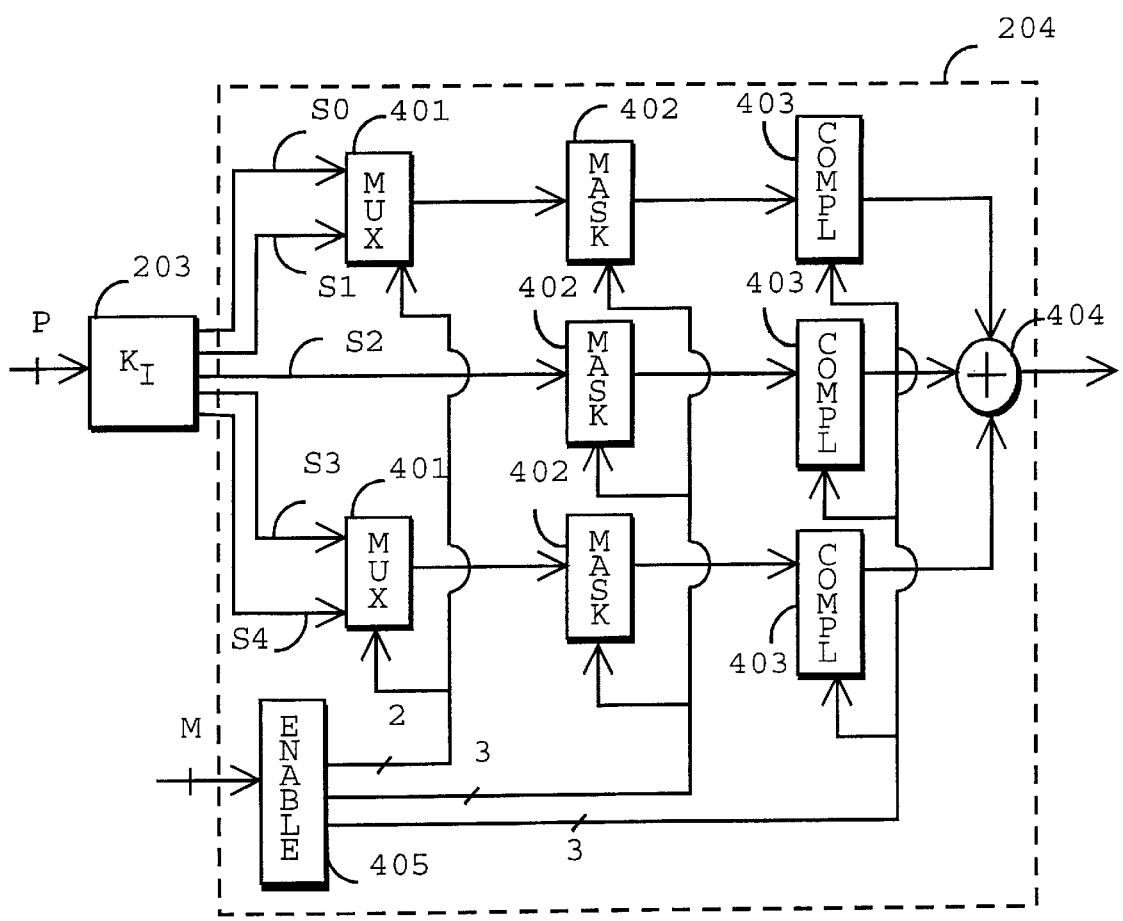
FIG. 5 is a block diagram illustrating a correcting part of a converter of the invention.

Let us now study a practical implementation of the invention in greater detail with reference to FIGS. 3 to 5. In a converter 10 according to FIG. 3, means 201 divide variable data 213 of n bits in two parts. A first part 207 of the variable data, which is preferably an MSB part, addresses an approximation to a straight line and determines from it an slope $k_i$ in means 203 and a constant part $c_i$ in means 202, means 202 and 203 being preferably ROM memories. A second part 208 of the variable data, which is preferably an LSB part, determines a point on the approximative straight line. Means 204 use the first part 207 of the variable data of an slope 210 and the variable data 208 for generating amplitude data 211 corresponding to a straight line traversing the origo. Said data 211 is summed in means 205 to a constant term 209, obtaining thus approximated amplitude data 212, which can be corrected by rounding in means 206. In rounding, decimal parts are rounded to a nearest whole number. Over-accuracy preferably used in the calculation can be removed by reducing LSB bits. Using over-accuracy in the calculation reduces the quantization error. LSB bits are preferably reduced by arithmetically shifting the bit sequence of an amplitude to the left. The dividing of variable data 213 in means 201 is important for the inventive solution, because the dividing of the variable data 213 allows smaller memories to be used.

The coefficient $k_i$ in means 203 is preferably multiplied by a half of the M number of points on an approximative straight line. A multiplication operation is preferably not performed, but the slope products are generated in advance, in connection with the linearization, and stored in the means 203. So, if the number of points on one straight line is M=32, the slope $k_i$ is multiplied by 16. This increases the accuracy of the calculation and enables a multiplication product to be generated in the means 204 without actual multiplication, using an arithmetical shifting of slope data, multiplexing of arithmetically shifted slopes, masking, complementing and summing performed by controlling of the second part 208 of the variable data.

FIG. 4 illustrates a solution of a converter 10 in a situation where the length of the output data of means 202 is shortened by removing at least one MSB bit from output data 302. This can be performed at least on sine functions. In more concrete terms, this means that from any desired function g(z) generating a desired amplitude for a signal is subtracted a linear function. i.e. when a sine function is concerned, for instance sin(z)−tz where t is any freely selected constant, as shown in FIG. 2. This reduces the size of the memory in the means 202, if t is suitably selected. In the case of a sine function, t is preferably $$t = \frac{2}{\pi}.$$

When amplitude data comprises as many bits as variable data 213, i.e. n=WO, variable data z can be subtracted directly from the value of function g(z). In other case means 251, which proportion the first constant part 302, are needed. The means 251 receive the first part 207 (the MSB bits) of the variable data, said part preferably comprising p bits. As regards the operation of the solution, it is possible that p+m bits, i.e. the entire variable data, would arrive at the means 251. The proportioning according to bit quantity is most preferably performed by multiplying the MSB bit/bits of the variable data 213 by a ratio WO/p or WO/(p+m) or in a similar manner. A proportioning product 301 is summed to the first constant part 302 in means 252 and a proportioned constant term 209 is summed to the product 211 according to the inventive solution. The solution can also be implemented using a device according to FIG. 3 to generate the slope and the constant part by means of a function g(z)=f(z)−tz and by adding the linear part tz to the generated product 212, for instance in the means 206. If the first part 207 of the variable data, which has p bits, is used in the proportioning, z in the linear part to be subtracted must also be proportioned, whereby t*int(z/$2^m$), which corresponds to the number of LSB bits, is subtracted instead of the part tz.

FIG. 5 is a block diagram illustrating an inventive means 204, which enables a direct multiplication operation to be avoided. Since multiplication is a slow operation, avoiding it speeds up the operation of the inventive solution. The means 204 comprises multiplexing means 401, masking means 402, complementing means 403, a summer 404 and a switching means 405 controlling the operation and receiving the second part 208 of the variable data. The number of the multiplexing means 401, masking means 402 and complementing means 403 depends on the M number of points on the approximative straight line. In FIG. 4, S0 represents the slope data 210 arriving from the means 203 as such; S1 represents the slope data 210 arithmetically shifted one bit to the right, corresponding to division by two; S2 represents the slope data 210 arithmetically shifted two bits to the right, corresponding to division by four: S3 represents the slope data 210 arithmetically shifted three bits to the right, corresponding to division by eight; and S4 represents the slope data 210 arithmetically shifted four bits to the right, corresponding to division by sixteen. The arithmetic shifts are performed for instance in the means 203 or, in connection with multiplexing, in the means 401. All multiplication products between the slope data and a point 101 on an approximative straight line can be generated as a combination of the arithmetically shifted slope data. A table can then be produced on how to combine the arithmetically shifted slope data. The number of different combination alternatives is almost unlimited, one advantageous criterion being, however, that coefficient data arriving at one and the same multiplexing means are not used in summing, i.e. for instance arithmetically shifted data S0 and S1 are not simultaneously accepted to means 404. A desired operation is thus obtained using for instance table 1. Table 1 is based on the assumption, by way of example, that M points on a straight line is $2^5=32$. A corresponding table can be produced for any number of points on a straight line, provided that the M points is a power of two. The means 204 converts the second part 208 of the variable data to positive and negative variable values (z->x) in connection with the arithmetic shifting of slope bits, multiplexing, masking, complementing and summing.

TABLE 1

Example of an arithmetic shifting of bits to be summed for generating a multiplication product in the means 204.

| $b_1 - a_1$ | shift |
|---|---|
| 0 | masked |
| 1 | S4 |
| 2 | S3 |
| 3 | S2 − S4 |
| 4 | S2 |
| 5 | S2 + S4 |
| 6 | S2 + S3 |
| 7 | S1 − S4 |
| 8 | S1 |
| 9 | S1 + S4 |
| 10 | S1 + S3 |
| 11 | S1 + S2 − S4 |
| 12 | S1 + S2 |
| 13 | S1 + S2 + S4 |
| 14 | S0 − S3 |
| 15 | S0 − S4 |

In table 1, S1+S2−S4 represents a summing of terms S1 and S2, form which is subtracted S4. The subtraction is performed by complementing S4. In table 1, preferably only half of the points on a straight line that are on a particular side of a point in the middle (shown with a thick line in FIG. 1) are taken into account. This is possible because the values of the points on the other side of the point in the middle of the straight line can be calculated by complementing the values of the points generated. This procedure advantageously reduces the size of the memory and speeds up the operation of the inventive method. The complementing is performed using either 2 or 1-complementation.

Combinations according to table 1 are obtained by means of a switching means 405 controlling the operation, said means separately enabling or disabling the operation of the means 401 to 403. The switching means 405 can be provided using logic circuits or in the form of a table, using memory circuits in a manner apparent to a person skilled in the art. The output of the means 405 is the second part 208 of the variable data, said part functioning as the output of logic circuits and/or as the address of memory circuits.

Also a ½-LSB offset can be performed on data to be complemented, so as to allow particularly amplitudes corresponding to a full 2Π circle of a sequence of a sine function to be simplified. A ½-LSB offset allows 1-complementation instead of 2-complementation to be performed without an error, and 1-complementation, in turn, saves hardware because 1-complementation can be performed using an exclusive or-port XOR. In addition, the constant term $c_1$ and the coefficient term $_1k$ can be stored in one memory, instead of two separate memories, because they have identical addresses. This reduces both the size of the memory and the surface of a VLSI chip.

Although the invention is described above with reference to an example in the attached drawings, it is apparent that the invention is not restricted to it, but can vary in many ways within the inventive idea disclosed in the attached claims

What is claimed is:

1. A method for generating a signal amplitude behaving according to a desired function; in said method amplitude is generated digitally and variable data (213) of the function is used as address data, comprising:

representing a desired amplitude behaviour in an approximative manner by means of a predetermined number N of piecewise straight lines each of which has a slope (210) and a constant term (209) that are stored, and said straight lines being generated using a linear regression and comprising a predetermined number M of variable values;

dividing address data (213) in two parts, a first part (207) functioning as an address for the slope and the constant term of each straight line and a second part (208) corresponding to a variable value on each piecewise straight line;

converting addresses of the second part (208) of the address data to negative and positive variable values of the straight lines so that an address substantially in the middle of the second part (208) of the address data becomes a variable value, which is preferably zero;

selecting, by means of the first part (207) of the address data, the slope (210) and the constant term (209) of each generated approximative straight line and selecting, by means of the second part (208), a variable value on a piecewise straight line;

generating, by means of the variable value and the slope, a coefficient term (211) of the piecewise straight line;

generating a desired amplitude value (212) by summing the coefficient term (211) and the constant term (209) of the piecewise straight line.

2. The method according to claim 1, further comprising providing the function, according to which the amplitude is to behave, as a sequential sine or cosine function, the amplitude values of the whole sequence of which are generated of already generated amplitude values of a quarter sequence.

3. The method according to claim 1, further comprises multiplying the slope (210) of a straight line, for improved accuracy, by a number that is a half of the number M of the values on the piecewise straight line; and when the number M of variable values on the piecewise straight line is a power of two, a conversion of the address data between negative variable values and positive variable values and an operation corresponding to the generating of a product between the second part (208) of the address data and the slope (210) are performed by an arithmetic shift, masking and complementing of the bits of the slope (210), and by summing of the arithmetically shifted, masked and complemented slopes;

said conversion and operation being controlled by the second part (208) of the address data.

4. The method according to claim 3, wherein generating the coefficient term (211) of the piecewise straight line further comprises converting addresses of the second part (208) to positive and negative variable values and generating the slope (210) based on the second part (208), wherein the conversion includes bit complementing.

5. The method according to claim 4, wherein at when a ½-bit phase shift is used, the complementing is performed by 1-complementation.

6. The method according to claim 3, wherein when a ½-bit phase shift is used, the complementing is performed by 1-complementation.

7. The method according to claim 1, further comprising providing a reduction in a quantization error in order to increase amplitude accuracy, the method is implemented using over-accuracy which is removed from the amplitude value (212) in the end.

8. The method according to claim 1, wherein generating the coefficient term (211) of the piecewise straight line further comprises converting addresses of the second part (208) to positive and negative variable values and generating the slope (210) based on the second part (208), wherein the conversion includes bit complementing.

9. The method according to claim 8, wherein when a ½-bit phase shift is used, the complementing is performed by 1-complementation.

10. A method for generating a signal amplitude behaving according to a desired function; in said method amplitude is generated digitally and variable data (213) of the function is used as address data, comprising:

generating, by means of straight lines, a piecewise linear approximation of a function $g(z)=f(z)-tz$, where $f(z)$ is a function according to which the amplitude is to behave, z is a variable value and t is a constant, said approximation comprising a predetermined number N of straight lines a slope (210) and a first constant part (302) of which are stored; said straight lines being generated by a linear regression and comprising a predetermined number M of variable values;

dividing the address data (213) in two parts, a first part (207) functioning as an address for the slope (210) and the first constant part (302) of each straight line and for a first part tz (301) of the address data multiplied by the constant, and a second part (208) corresponding to a variable value on each piecewise straight line;

converting addresses of the second part (208) of the address data to positive and negative variable values so that an address substantially in the middle (103) of the address data becomes a variable value, which is preferably zero;

selecting, by means of the first part (207) of the address data, the slope (210), the first constant (302) and the first part tz (301) of the address data, multiplied by the constant, in each generated approximative straight line, and selecting, by means of the second part (208), the variable value on the piecewise straight line;

generating, by means of the variable value and the slope (210) determined by the second part (208) of the address data, a coefficient term (211) of the piecewise straight line;

generating a desired amplitude value (212) by summing the coefficient term (211), the first constant part (302) and the first part tz (301) of the address data, multiplied by the constant, of the piecewise straight line.

11. The method according to claim 10, further comprising providing the function, according to which the amplitude is to behave, as a sequential sine or cosine function the amplitude values of the whole sequence of which are generated of already generated amplitude values of a quarter sequence.

12. The method according to claim 10, further comprises multiplying the slope (210) of a straight line, for improved accuracy, by a number representing a half of the M values on the piecewise straight line; and when the number M of variable values on the piecewise straight line is a power of two, a conversion of the address data to negative and positive variable values and an operation corresponding to the generating of a product between the second part (208) of the address data and the slope (210) are performed by an arithmetic shift, masking and complementing of the bits of the slope (210), and by summing of the arithmetically shifted, masked and complemented slopes, said conversion and operation being performed by controlling the second part (208) of the address data.

13. The method according to claim 12, wherein when a ½-bit phase shift is used, the complementing is performed by 1-complementation.

14. The method according to claim 12, wherein generating the coefficient term (211) of the piecewise straight line further comprises converting addresses of the second part (208) to positive and negative variable values and generating the slope (210) based on the second part (208), wherein the conversion includes bit complementing.

15. The method according to claim 14, wherein when a ½-bit phase shift is used, the complementing is performed by 1-complementation.

16. The method according to claim 10, further comprising providing a reduction in a quantization error in order to increase amplitude accuracy, the method is implemented using over-accuracy which is removed from the amplitude value (212) in the end.

17. The method according to claim 10, wherein generating the coefficient term (211) of the piecewise straight line further comprises converting addresses of the second part (208) to positive and negative variable values and generating the slope (210) based on the second part (208), wherein the conversion includes bit complementing.

18. The method according to claim 17, wherein when a ½-bit phase shift is used, the complementing is performed by 1-complementation.

19. A converter (10) for generating a signal amplitude behaving according to a desired function, the converter being arranged to generate the amplitude digitally and to use variable data (213) of the function as address data, wherein the converter (10) comprises
- a memory (202 and 203) for describing the behaviour of an amplitude according to a desired function on approximatively piecewise straight lines, with a slope (210) and a constant term (209) being stored in the memory (202 and 203), said straight lines being generated by a linear regression and comprising a predetermined number of variable values;
- means (201) for dividing the address data in two part, a first part (207) determining the slope (210) and the constant term (209) of each generated approximative straight line, and the second part (208) corresponding to variable values of each piecewise straight line;
- means (204) for converting the addresses of the second part of the address data to positive and negative variable values so that an address substantially in the middle of the second part (208) of the address data becomes a variable value, which is preferably zero, and for generating, by means of the variable value and the slope (210) based on the second part (208) of the address data, a coefficient term (211) of the piecewise straight line;
- means (205) for generating desired amplitude data (212) by summing the coefficient term (211) and the constant term (209) of the piecewise straight line.

20. The converter (10) according to claim 19, wherein the converter (10) is arranged to generate a sequential signal amplitude (212) preferably behaving according to a sine or cosine function.

21. The converter (10) according to claim 19, wherein, for improved accuracy, the means (204) are arranged to multiply the slope (210) of the straight line by a number equal to a half of a number of points on the piecewise straight line and
- means (204) are arranged to convert the second part (208) of the address data between negative variable values and positive variable values to perform an operation corresponding to multiplication between the variable value and the slope (210) by an arithmetic shift, masking and complementing of bits of the slope, and by summing;
- wherein the conversion and operation being controlled by the second part (208) of the address data.

22. The converter (10) according to claim 19, wherein when the coefficient term (211) and the slope (210) are in ½-LSB phase shift, means (204) and means (403) are arranged to perform a complementation as 1-complementation.

23. The converter (10) according to claim 19, further comprising a reduction in a quantization error for increased amplitude accuracy, the converter (10) is arranged to use over-accuracy, which means (206) are arranged to remove in the end from the amplitude (212).

24. The converter (10) according to claim 19, wherein the generation of the coefficient term (211) of the piecewise straight line further comprises converting addresses of the second part (208) to positive and negative variable values and generating the slope (210) based on the second part (208), wherein the conversion includes bit complementing.

25. The converter (10) according to claim 24, wherein when the coefficient term (211) and the slope (210) are in ½-LSB phase shift, means (204) and mean (403) are arranged to perform a complementation as 1-complementation.

26. A converter (10) for generating a signal amplitude behaving according to a desired function, the converter being arranged to generate the amplitude digitally and to use variable data (213) of the function as address data, wherein the converter (10) comprises
- a memory (202 and 203) for generating, by means of straight lines, a piecewise linear approximation of a function $g(z)=f(z)-tz$, where $f(z)$ is the function according to which an amplitude (212) is to behave, $z$ is a variable and $t$ is a constant, the approximation comprising a predetermined number N of straight lines, with a slope (210) and a first constant part (302) being stored in the memory (202 and 203), said straight lines being generated by a linear regression and comprising a predetermined number M of variable values;
- means (251) for generating a first part $tz$ (301) of the address data multiplied by a constant;
- means (201) for dividing the address data in two parts, a first part (207) determining the slope (210) and the constant term (209) of each generated approximative straight line, and the second part (208) corresponding to variable values of each piecewise straight line;
- means (204) for converting the addresses of the second part of the address data to positive and negative variable values so that an address substantially in the middle of the address data becomes a variable value, which is preferably zero, and for generating a coefficient term (211) of a piecewise straight line, using a variable value and the slope (210) based on the second part (208) of the address data;
- means (252) for summing a first constant part (302) and the first part $tz$ (301) of the address data multiplied by the constant; and
- means (205) for generating desired amplitude data (212) by summing the coefficient part (211) and the corrected constant part, constant term (209), of the piecewise straight tine.

27. The converter (10) according to claim 26, wherein the converter (10) is arranged to generate a sequential signal amplitude (212) preferably behaving according to a sine or cosine function.

28. The converter (10) according to claim 26, wherein, for improved accuracy, the means (204) are arranged to multiply the slope (210) of the straight line by a number equal to a half of a number of points on the piecewise straight line and
- means (204) are arranged to convert the second part (208) of the address data between negative variable values and positive variable values to perform an operation corresponding to multiplication between the variable value and the slope (210) by an arithmetic shift, masking and complementing of bits of the slope, and by summing;
- wherein the conversion and operation being controlled by being controlled by the second part (208) of the address data.

29. The converter (10) according to claim 28, wherein when the coefficient term (211) and the slope (210) are in ½-LSB phase shift, means (204) and mean (403) are arranged to perform a complementation as 1-complementation.

30. The converter (10) according to claim 26, further comprising a reduction in a quantization error for increased amplitude accuracy, the converter (10) is arranged to use over-accuracy, which means (206) are arranged to remove in the end from the amplitude (212).

31. The converter (10) according to claim 26, wherein the generation of the coefficient term (211) of the piecewise straight line further comprises converting addresses of the second part (208) to positive and negative variable values and generating the slope (210) based on the second part (208), wherein the conversion includes bit complementing.

32. The converter (10) according to claim 31, wherein when the coefficient term (211) and the slope (210) are in ½-LSB phase shift, means (204) and mean (403) are arranged to perform a complementation as 1-complementation.

* * * * *